(12) United States Patent
Kiel et al.

(10) Patent No.: US 8,963,932 B1
(45) Date of Patent: *Feb. 24, 2015

(54) METHOD AND APPARATUS FOR VISUALIZING COMPONENT WORKLOADS IN A UNIFIED SHADER GPU ARCHITECTURE

(75) Inventors: Jeffrey T. Kiel, Raleigh, NC (US); Derek M. Cornish, Durham, NC (US)

(73) Assignee: Nvidia Corporation, Santa Clara, CA (US)

( * ) Notice: Subject to any disclaimer, the term of this patent is extended or adjusted under 35 U.S.C. 154(b) by 856 days.

This patent is subject to a terminal disclaimer.

(21) Appl. No.: 11/641,447

(22) Filed: Dec. 18, 2006

Related U.S. Application Data

(63) Continuation-in-part of application No. 11/497,863, filed on Aug. 1, 2006, and a continuation-in-part of application No. 11/498,203, filed on Aug. 1, 2006, and a continuation-in-part of application No. 11/498,229, filed on Aug. 1, 2006.

(51) Int. Cl.
*G06T 1/20* (2006.01)

(52) U.S. Cl.
USPC ........... 345/506; 345/440; 345/502; 345/505; 345/522

(58) Field of Classification Search
None
See application file for complete search history.

(56) References Cited

U.S. PATENT DOCUMENTS

| | | |
|---|---|---|
| 5,643,086 A | 7/1997 | Alcorn et al. |
| 5,752,062 A | 5/1998 | Gover et al. |
| 5,757,919 A | 5/1998 | Herbert et al. |
| 5,815,154 A | 9/1998 | Hirschtick et al. |
| 5,892,904 A | 4/1999 | Atkinson et al. |
| 5,920,725 A | 7/1999 | Ma et al. |
| 5,970,147 A | 10/1999 | Davis |
| 5,978,484 A | 11/1999 | Apperson et al. |
| 5,999,737 A | 12/1999 | Srivastava |
| 6,016,474 A | 1/2000 | Kim et al. |
| 6,157,618 A | 12/2000 | Boss et al. |
| 6,266,416 B1 | 7/2001 | Sigbjørnsen et al. |
| 6,330,008 B1 | 12/2001 | Razdow et al. |
| 6,362,825 B1 | 3/2002 | Johnson |
| 6,412,039 B1 | 6/2002 | Chang |
| 6,668,325 B1 | 12/2003 | Collberg et al. |
| 6,684,389 B1 | 1/2004 | Tanaka et al. |

(Continued)

OTHER PUBLICATIONS

C. Cebenoyan and M. Wloka, "Optimizing the Graphics Pipeline", 2003, Nvidia GDC Presentation Slides.*

(Continued)

*Primary Examiner* — Ulka Chauhan
*Assistant Examiner* — Robert Bader

(57) ABSTRACT

A method of calculating performance parameters for a type of data being executed by a unified processing subunit. In one embodiment, a task (e.g., a draw call) is executed by a processing pipeline (e.g., a GPU). An ALU within a unified processing subunit (e.g., a unified shader processing unit) is queried to determine a type of data (e.g., vertex processing, pixel shading) being processed by the ALU. Performance parameters (e.g., bottleneck and utilization) for the type of data being processed by the ALU is calculated and displayed (e.g., stacked graph). Accordingly, software developers can visualize component workloads of a unified processing subunit architecture. As a result, utilization of the unified processing subunit processing a particular data may be maximized while bottleneck is reduced. Therefore, the efficiency of the unified processing subunit and the processing pipeline is improved.

22 Claims, 5 Drawing Sheets

(56) References Cited

U.S. PATENT DOCUMENTS

| | | | |
|---|---|---|---|
| 6,732,060 | B1 | 5/2004 | Lee |
| 6,901,582 | B1 | 5/2005 | Harrison |
| 6,943,800 | B2 | 9/2005 | Taylor et al. |
| 6,965,994 | B1 | 11/2005 | Brownell et al. |
| 7,047,519 | B2 | 5/2006 | Bates et al. |
| 7,095,416 | B1 | 8/2006 | Johns et al. |
| 7,107,484 | B2 | 9/2006 | Yamazaki et al. |
| 7,173,635 | B2 | 2/2007 | Amann et al. |
| 7,237,151 | B2 | 6/2007 | Swoboda et al. |
| 7,260,066 | B2 | 8/2007 | Wang et al. |
| 7,277,826 | B2 * | 10/2007 | Castelli et al. ................. 702/186 |
| 7,383,205 | B1 | 6/2008 | Peinado et al. |
| 7,395,426 | B2 | 7/2008 | Lee et al. |
| 7,401,116 | B1 * | 7/2008 | Chalfin et al. ................. 709/203 |
| 7,401,242 | B2 * | 7/2008 | Abernathy et al. ............ 713/320 |
| 7,420,563 | B2 | 9/2008 | Wakabayashi |
| 7,505,953 | B2 * | 3/2009 | Doshi ................................... 1/1 |
| 7,555,499 | B2 * | 6/2009 | Shah et al. ...................... 707/688 |
| 7,765,500 | B2 | 7/2010 | Hakura et al. |
| 7,778,800 | B2 | 8/2010 | Aguaviva et al. |
| 7,891,012 | B1 | 2/2011 | Kiel et al. |
| 8,436,870 | B1 * | 5/2013 | Aguaviva et al. .............. 345/619 |
| 8,448,002 | B2 * | 5/2013 | Bulusu et al. .................. 713/323 |
| 8,452,981 | B1 * | 5/2013 | Kiel et al. ...................... 713/189 |
| 2001/0034835 | A1 | 10/2001 | Smith |
| 2001/0044928 | A1 | 11/2001 | Akaike et al. |
| 2002/0157086 | A1 | 10/2002 | Lewis et al. |
| 2002/0175839 | A1 * | 11/2002 | Frey ................................. 341/50 |
| 2003/0043022 | A1 | 3/2003 | Burgan et al. |
| 2003/0120935 | A1 | 6/2003 | Teal et al. |
| 2003/0214660 | A1 | 11/2003 | Plass et al. |
| 2004/0085894 | A1 | 5/2004 | Wang et al. |
| 2004/0130552 | A1 | 7/2004 | Duluk, Jr. et al. |
| 2004/0158824 | A1 | 8/2004 | Gennip et al. |
| 2004/0162989 | A1 | 8/2004 | Kirovski |
| 2005/0198051 | A1 | 9/2005 | Marr et al. |
| 2005/0222881 | A1 * | 10/2005 | Booker ............................. 705/7 |
| 2005/0243094 | A1 * | 11/2005 | Patel et al. ..................... 345/506 |
| 2005/0273652 | A1 * | 12/2005 | Okawa et al. ................... 714/10 |
| 2005/0278684 | A1 | 12/2005 | Hamilton et al. |
| 2006/0047958 | A1 | 3/2006 | Morais |
| 2006/0079333 | A1 | 4/2006 | Morrow et al. |
| 2006/0080625 | A1 | 4/2006 | Bose et al. |
| 2006/0109846 | A1 | 5/2006 | Lioy et al. |
| 2006/0152509 | A1 * | 7/2006 | Heirich .......................... 345/426 |
| 2006/0161761 | A1 | 7/2006 | Schwartz et al. |
| 2006/0185017 | A1 | 8/2006 | Challener et al. |
| 2007/0115292 | A1 | 5/2007 | Brothers et al. |
| 2007/0274284 | A1 | 11/2007 | Dendukuri et al. |
| 2008/0007563 | A1 | 1/2008 | Aronson et al. |
| 2008/0095090 | A1 | 4/2008 | Lee et al. |

OTHER PUBLICATIONS

Jeffrey K. Hollingsworth and Barton P. Miller, "Dynamic Control of Performance Monitoring on Large Scale Parallel Systems", Jul. 23, 1993, ACM, International Conference on Supercomputing: Proceedings of the 7th International Conference on Supercomputing, pp. 185-194.*

Dror G. Feitelson and Larry Rudolph, "Toward Convergence in Job Scheduling for Parallel Supercomputers", Aug. 1996, Springer, Job Scheduling Strategies for Parallel Processing: IPPS '96 Workshop Honolulu, Hawaii, Apr. 16, 1996 Proceedings.*

Josh Lessard, "Profiling Concurrent Programs Using Hardware Counters", May 2005, University of Waterloo, Thesis, (abridged copy provided).* gDEBugger, graphicREMEDY, http://www.gremedy.com, Aug. 8, 2006.

Duca et al.; A Relational Debugging Engine for the Graphics Pipeline; International Conference on Computer Graphics and Interactive Techniques; ACM SIGGRAPH 2005; pp. 453-463; ISSN:0730-0301.

"MaxVUE Graphic Editor", Metso Automation, 2005, pp. 1-6, http://www.metsoautomation.com/automation/indes.nsf/FR?Readform&ATL=aitp,atopm/ed_prod.nsf/WebWID/WTB-04110-22256F-2445A; eHB.

"ATI Radeon X800, 3D Architecture White Paper", ATI, 2005, pp. 1-13, with proof of seniority (4pages), according to ACM bibliography regarding the document: The Direct3D 10 system:, ACM TOG, vol. 25, Iss. 3 (Jul. 2006), Reference 1; eHG.

N. Tatarchuk, "New RenderMonkey Features for DirectX and Open GL Shader Development", Game Developers Conference, Mar. 2004.

gDEBugger, graphicREMEDY, http://www.gremedy.com/, Aug. 7, 2006.

"GPU Performance Optimization with NVPerfHUD." NVPerfHUD 3.0. A Heads-Up Display for Performance Analysis. Nvidia Corporation. Apr. 2005, Downloaded Jan. 16, 2014: http://web.archive.org/web/20060429222414/http://download.nvidia.com/developer/tools/nvperfhud/3.1/userguide_japanese.pdf.

"NVPerfHUD," Jul. 2, 2006, Downloaded Jan. 16, 2014: http://web.archive.org/web/20060702062602/http://developer.nvidia.com/object/nvperfhud_home.html.

"maxVUE Graphic Editor"Metso Automation, 2005, pp. 1-6, http://www.metsoautomation.com/automation/indes.nsf/FR?Readform&ATL=automation/ed.sub.—prod.nsf/WebWID/WTB-041110-22256F-2445A; eHB.

Ati Radeon X800, 3D Architecture White Paper:, ATI, 2005, pp. 1-13, with proof of seniority (4 pages), according to ACM bibliography regarding the document: "The Direct3D 10 system", ACM TOG, vol. 25, Iss.3 (Jul. 2006), Reference 1; eHG.

N. Tatarchuk, "New RenderMonkey Features for DirectX and OpenGL Shader Development", Game Developers Conference, Mar. 2004.

Entry on Wikipedia dated Oct. 7, 2006 regarding the term "Debugger", URL: http://en.wikipedia.org/w/index.php?title=Debugger&oldid=63069774, [search carried out on Aug. 27, 2012].

Kiel, J. [et al.]: NVIDIA Performance Tools. Slides presented during the lecture given on the occasion of the Game Developers Conference in Mar. 2006, Downloaded on Aug. 28, 2012 in archive.org under the following URL associated with a capture of May 26, 2006: http://web.archive.org/web/20060526023128/http://download.nvidia.com/developer/presentations/2006/gdc/2006-GDC-Performance-Tools.pdf.

* cited by examiner

METHOD AND APPARATUS FOR VISUALIZING COMPONENT WORKLOADS IN A UNIFIED SHADER GPU ARCHITECTURE

RELATED U.S. PATENT APPLICATION

This Continuation in Part application claims the benefit of the co-pending U.S. patent application Ser. No. 11/497,863 filed on Aug. 1, 2006, by Aguaviva et al., and entitled "A Method And System For Calculating Performance Parameters For A Processor" and assigned to the assignee of the present invention, and U.S. patent application Ser. No. 11/498,203 filed on Aug. 1, 2006, by Aguaviva et al., and entitled "A Method And System For Debugging A Graphics Pipeline Subunit" and assigned to the assignee of the present invention, and U.S. patent application Ser. No. 11/498,229 filed on Aug. 1, 2006, by Aguaviva et al., and entitled "Method And User Interface For Enhanced Graphical Operation Organization" and assigned to the assignee of the present invention, which are incorporated herein by reference.

TECHNICAL FIELD

The present invention relates to the field of processors. More particularly, embodiments of the present invention relate to a method and system for calculating performance parameters for a unified processor architecture.

BACKGROUND ART

In recent years, processing subunits that are in general pipelined have substantially increased in complexity. As a result, the increase in complexity has led to an increase in difficulty in determining performance characteristics of a processor. Therefore, achieving optimal performance out of a processor has become a daunting task. Since a processor pipeline runs only as fast as its slowest processing subunit, it is important to identify and address the slower stages of the pipeline in order to improve the efficiency of the processor.

In general, details of an application being executed on a processor and its performance are hidden from the user in order to protect the manufacturers' proprietary information. On the other hand, providing detailed information of an application executing on a processor and its performance allows software developers to improve the efficiency of their software running on such a processor. Accordingly, there is a tradeoff between protecting the proprietary information of the manufacturer of the processor and improving the performance of the software running on the processor.

Moreover, increasing need for efficiency has also led to development of multi-functional processing subunits (e.g., unified processing subunits). Accordingly, unified processing subunits are not dedicated to process one type of data, but may process a variety of data types. For example, in a graphical processing unit (GPU), a unified shader processing subunit may process vertex information, transform and generate new triangles, determine corresponding pixels for the generated triangles and compute color, lighting and alpha value for these pixels. Accordingly, a multifunctional processing unit further complicates determining the performance parameters for the processing unit since different types of data are being processed by the processing unit.

Unfortunately, it is a difficult task to isolate a particular processing unit within the GPU pipeline by merely varying the workload. Moreover, there is a tradeoff between exposing internal GPU information/performance data and improving the frame rate. Furthermore, isolating a particular processing unit (e.g., multi-functional processing subunit) fails to provide the performance parameters for individual data types being processed by a unified processing subunit. For example, isolating a unified shader processing subunit in a GPU pipeline and calculating performance parameters (e.g., bottleneck and utilization) for a unified shader subunit in a GPU pipeline provides performance parameters for a unified shader subunit as a whole. As such, calculating performance parameters fails to provide performance parameter information for the type of data processed by the unified shader processing unit (e.g., vertex, geometry, and pixel).

Accordingly, software developers are unaware of the type of data causing bottleneck in a unified processing subunit. Similarly, software developers are unaware of data types which maximize utilization of unified processing subunit. Moreover, software developers are unaware of the type of data that are computationally intensive (e.g., vertex intensive, pixel intensive or geometrically intensive data). In other words, software developers are unaware of component workloads in a unified processing subunit. Accordingly, it is difficult to improve the performance of a unified processing subunit without visualizing component workloads in a unified processing subunit.

SUMMARY

Accordingly, a need has arisen to provide a method and a system to calculate and provide performance parameters for a prescribed type of data being processed by a unified processing subunit within a processor pipeline. It will become apparent to those skilled in the art after reading the detailed description of the present invention that the embodiments of the present invention satisfy the above mentioned needs.

In one embodiment of the present invention, an executable task (e.g., a draw call) is executed by a processing pipeline (e.g., GPU) that comprises at least one unified processing subunit (e.g., a unified shader processing subunit). During the execution of the task, the unified processing subunit is queried to determine the type of data being executed. Variables to calculate performance parameters (e.g., bottleneck and utilization) for the queried data type are determined. As a result, performance parameters for the queried data type may be calculated and displayed.

In one embodiment, the unified processing subunit is a unified shader processing subunit within a graphical processing unit (GPU). The unified shader processing subunit may process vertex data, geometry data and pixel data. Querying the unified shader processing subunit determines the type of data being processed by the unified shader. Accordingly, performance parameters for the type of data (e.g., vertex, pixel, or geometry) processed by the unified shader may be determined. As such, software developers achieve visibility to the type of data being processed by the unified shader processing subunit and their respective performance parameters. Therefore, the performance parameters may be used to determine the type of computationally intensive data causing a bottleneck or the type of data that fails to fully utilize the unified shader's resources. Consequently, component workloads in a unified processing subunit can be visualized. Accordingly, the performance parameters may be used to modify the graphics application to improve efficiency of the unified shader processing unit as well as the processor pipeline as a whole.

More specifically, an embodiment of the present invention pertains to a method of calculating performance parameters for a prescribed type of data being executed by a unified processor subunit, the method includes executing an executable task on a processor pipeline; querying the unified processor subunit and in response thereto determining a type of data being executed by the unified processor subunit; and calculating performance parameters for the unified processor subunit executing the data type.

The embodiments may include the above and wherein the unified processor subunit is operable to execute at least two types of data. Moreover, the embodiments include the above and wherein calculating the performance parameters for the unified processor subunit executing the data type include calculating a bottleneck, wherein the bottleneck is a measure of time that the unified processor subunit is processing the data type plus a measure of time that the unified processor subunit pauses an upstream component because the unified processor subunit is busy minus the time which the unified processor subunit is paused because a downstream component is busy and does not accept further data, all divided the time required by the processing pipeline to execute the executable task; and calculating utilization, wherein the utilization is a measure of a percentage that the unified processor subunit is processing the data type over the time the processing pipeline requires to execute the executable task.

The embodiments also include the above and wherein the unified processor subunit comprises a plurality of arithmetic logic units (ALUs), wherein the ALUs partially form the upstream component and the downstream component, and wherein the unified processing subunit is capable of executing vertex, geometry, rasterizer and pixel data types. In one embodiment the processor pipeline is a pipeline graphical processing unit (GPU) and wherein further the executable task is a draw call executed on the GPU. In one embodiment the method further includes outputting the calculated performance parameters for the unified processor subunit executing the data type. The output may be rendered by displaying calculated performance parameters for a plurality of data types executed by the unified processor subunit.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
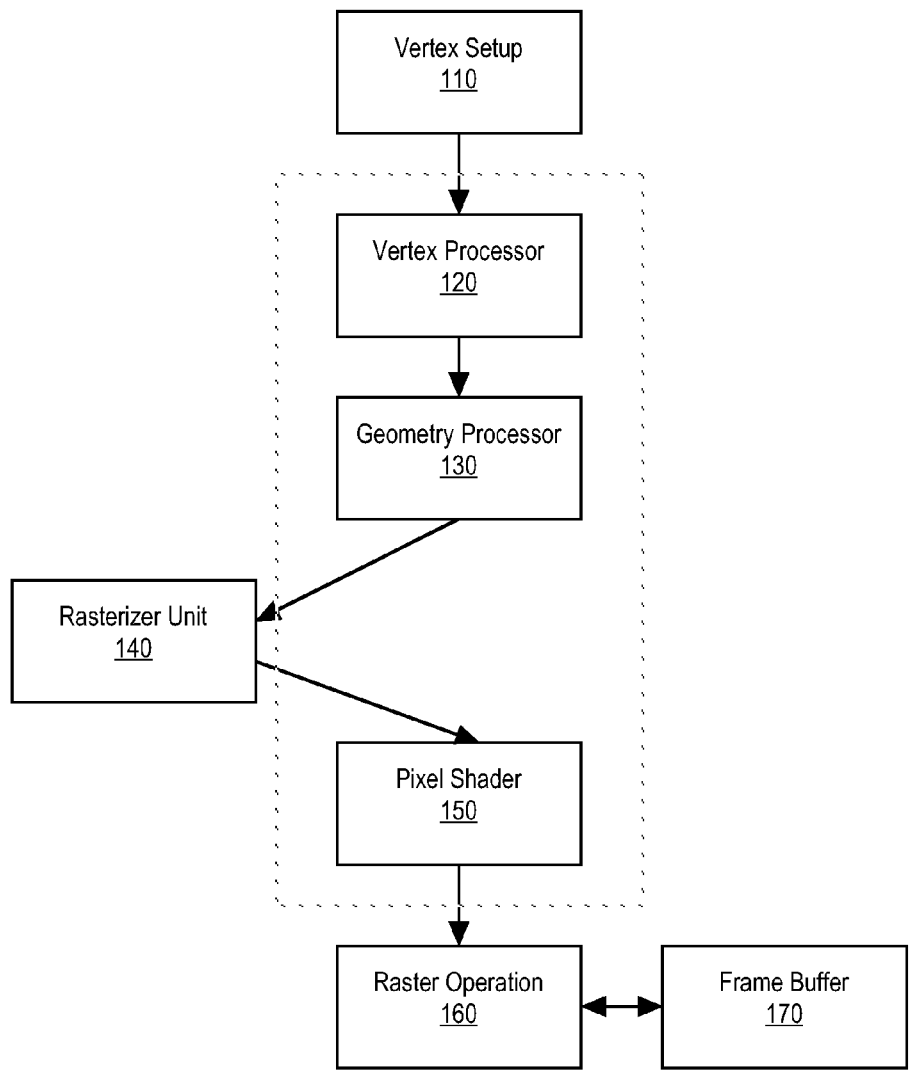
FIG. 1 shows an exemplary graphical processing unit (GPU) in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or "calculating" or "measuring" or "querying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and Apparatus for Visualizing Component Workloads in a Unified Shader GPU Architecture A method and system for calculating performance parameters for a type of data processed by a unified processor subunit in a processor pipeline are important in isolating problematic data types. For example, knowledge of a type of data being processed by a unified processing subunit is important in determining computationally intensive data that cause inefficiencies (e.g., bottlenecks) in the processing pipeline. Moreover, knowledge of a type of data being processed by a unified processing subunit is important in order to increase the utilization of a unified processing subunit without causing bottlenecks. Accordingly, software developers may use this information to modify their applications to optimize the performance of a unified processing subunit and the processing pipeline. In one embodiment where the processing pipeline is a graphical processing unit (GPU) and the unified processing subunit is a unified shader processing subunit, the frame rate of the application may be improved.

For example, calculating a utilization parameter and bottleneck information for a data type processed (e.g., vertex, geometry, rasterizer or pixel data) by the unified shader processing subunit allows software developers to modify their applications in order to optimize the performance of the unified shader processing subunit as well as the GPU pipeline as a whole. The performance of a unified shader processing subunit may be improved by determining computationally intensive data that cause bottlenecks or identify the type of data that fails to fully utilize the unified shader's resources. Moreover, the performance parameters may be used to increase utilization of each processing subunit and reduce bottlenecks in the processing pipeline.

It is appreciated that although embodiments described herein may make reference to a CPU and a GPU as discrete components of a computer system, those skilled in the art will recognize that a CPU and a GPU can be integrated into a single device, and the CPU and GPU may share various resources such as instruction logic, buffers and functional units, etc., to name a few. Moreover, it is appreciated that that separate resources may be provided for graphics and general-purpose operations. Accordingly, any or all of the circuits and/or functionality described herein as being associated with the GPU could be implemented in and performed by a suitably equipped CPU or combination thereof. Additionally, it is appreciated that while embodiments described herein may make reference to a GPU, it is to be understood that the circuits and/or functionality described herein could also be implemented in other types of processors, such as general-purpose or other special purpose co-processors, or within a CPU.

Referring now to FIG. 1, an exemplary GPU pipeline 100 in accordance with one embodiment of the present invention is shown. As part of a graphics application, a draw call may be dispatched to a GPU pipeline for execution. Typically, multiple draw call commands are used to assemble a frame of data. Draw calls are well known. Embodiments of the present invention can associate a subunit performance parameter with a particular draw call.

In general, a GPU includes a number of functional units operating in parallel in a pipeline fashion, which can be viewed as separate special processors coupled together in locations where a bottleneck can occur. These separate special processors where a bottleneck can occur include a vertex setup 110, a vertex shader 120, a geometry shader 130, a rasterizer unit 140, a pixel shader 150, a raster operation 160, and a frame buffer 170, to name a few. It is appreciated that the processing subunits shown in FIG. 1 are exemplary and are used to illustrate aspects of the present invention. Therefore, it is appreciated that the embodiments of the present invention can be practiced on any processor having pipeline subunits.

Referring still to FIG. 1, each of the special processor subunits within the GPU pipeline is described. The vertex setup 110 fetches vertices and indices to assemble the fetched data and collect vertex format, normal, color, smoothing and other attributes. The performance of the vertex setup 110 can vary depending on where the actual vertices and indices are placed, which is in general from the system memory or from the local frame buffer memory. The vertex setup 110 may include a counter (not shown) that may store various data information. For example, the vertex setup 110 may be sampled during a draw call and the counter may be incremented each time that the vertex setup 110 is active and is processing data.

In general, one method to draw an object is by defining a plurality of simple graphical objects (e.g., triangles). In order to define a triangle, three vertices of the triangle are used to determine the perimeter of the triangle. As such, a processing subunit such as the vertex setup 110 may be used. It is appreciated that other similar methods may be used. For example, a polygon may be defined instead of a triangle.

The vertex processor 120 is the transforming stage of the GPU pipeline where it receives a set of vertex attributes from the vertex setup 110 (e.g., model-space positions, vertex normals, texture coordinates, etc.). The vertex processor 120 runs a program on each vertex from a piece of geometry and as a result the object may be shrunk, expanded, and changed position, to name a few. In general, the performance of the vertex processor 120 is a function of the work done per vertex, along with the number of the vertices being produced. The vertex shader 120 may also include a counter (not shown) that may store various data information. For example, the vertex processor 120 may be sampled during a draw call and the counter may be incremented each time that the vertex processor 120 is active and is processing data.

The result of the vertex processor 120 may be sent to the geometry processor subunit 130. Geometry processor subunit 130 may be used to generate a more complicated shape from a simple figure (e.g., a triangle). For example, a triangle may be rendered by the vertex processor 120. In order to modify the rendered triangle, the vertices of the triangle can be changed (e.g., stretched). However, when a more complicated figure is required, either additional triangles should be rendered or the triangle rendered should be changed to create a more complicated shape. For example, a simple triangle with three vertices may be taken and an additional point between each two vertices may be designated by the geometry subunit 130. Accordingly, instead of having only three points (e.g., three vertices) to modify, there would be six points (e.g., three vertices and three additional points in between) that can be changed and modified to create a more complex figure. Accordingly, the geometry processor subunit 130 may be used to transform and generate new triangles. The geometry processor subunit 130 may include a counter (not shown) that may store various data information. For example, the geometry processor subunit 130 may be sampled during a draw call and the counter may be incremented each time that the geometry processor 130 is active and is processing data.

The rasterizer subunit 140 receives the resulting triangles from the geometry processor subunit 130. The rasterizer subunit 140 determines the pixels corresponding to the generated triangles. Accordingly, pixels corresponding to generated triangle are determined. The result is sent to the pixel shader subunit 150. The rasterizer subunit 140 may include a counter (not shown) that may store various data information. For example, the rasterizer subunit 140 may be sampled during a draw call and the counter may be incremented each time that the rasterizer subunit 140 is active and is processing data.

The pixel shader 150 is the processing subunit associated with color and depth value of an object. Therefore, the pixel shader 150 applies an appropriate color, depth value and alpha value to the object by running the program on each pixel. The pixel shader 150 provides different lighting to the object being drawn (e.g., shiny, dull, and etc.). The pixel shader 150 may include a counter (not shown) that may store various data information. For example, the pixel shader 150 may be sampled during a draw call and the counter may be incremented each time that the pixel shader 150 is active and is processing data.

The raster operation subunit 160 may receive the result of the pixel shader subunit 150. The raster operation subunit 160 is responsible for reading and writing depth and stencil, comparing depth and stencil, reading and writing color as well as alpha blending and testing. For example, the raster operation 160 decides the amount of color being added. Much of the raster operation 160 workload taxes the available frame buffer 170 bandwidth. Accordingly, in one embodiment of the present invention to determine whether the application is frame-buffer bandwidth-bound is to vary the bit depths of the color and/or depth buffers. If reducing the bit depth significantly improves the performance then the frame buffer 170 is bandwidth bound. The raster operation 160 may include a counter (not shown) that may store various data information. For example, the raster operation 160 may be sampled during a draw call and the counter may be incremented each time that the raster operation 160 is active and is processing data.

The frame buffer 170 may provide data from a memory component to another unit for additional support for special effects such as motion blur effects and explosions or simply to cache data, to name a few. Additionally, the frame buffer 170 stores pixel information. The frame buffer 170 may include a counter (not shown) that may store various data information. For example, the frame buffer 170 may be sampled during a draw call and the counter may be incremented each time that the frame buffer 170 is active and is processing data.

As described above, increasing needs for efficiency have lead to the development of multi-functional processing subunits. Accordingly, processor subunits are not dedicated to processing one type of data, but may process a variety of data types. For example, in the graphical processing unit (GPU) 100, a unified shader processing subunit 155 may comprise the functionality of the vertex processor 120, geometry processor 130, and the pixel shader 150 subunit as described above. It is appreciated that in one embodiment, the rasterizer subunit 140 processes data in parallel to that of the unified shader processing subunit 155.

It is appreciated that the rasterizer subunit 140 may be implemented within and as an integral part of the unified shader processing subunit 155. Accordingly, implementing the rasterizer subunit 140 separate from the unified shader processing subunit 155, as shown in FIG. 1, should not be construed as limiting the scope of the present invention.

Figure 2:
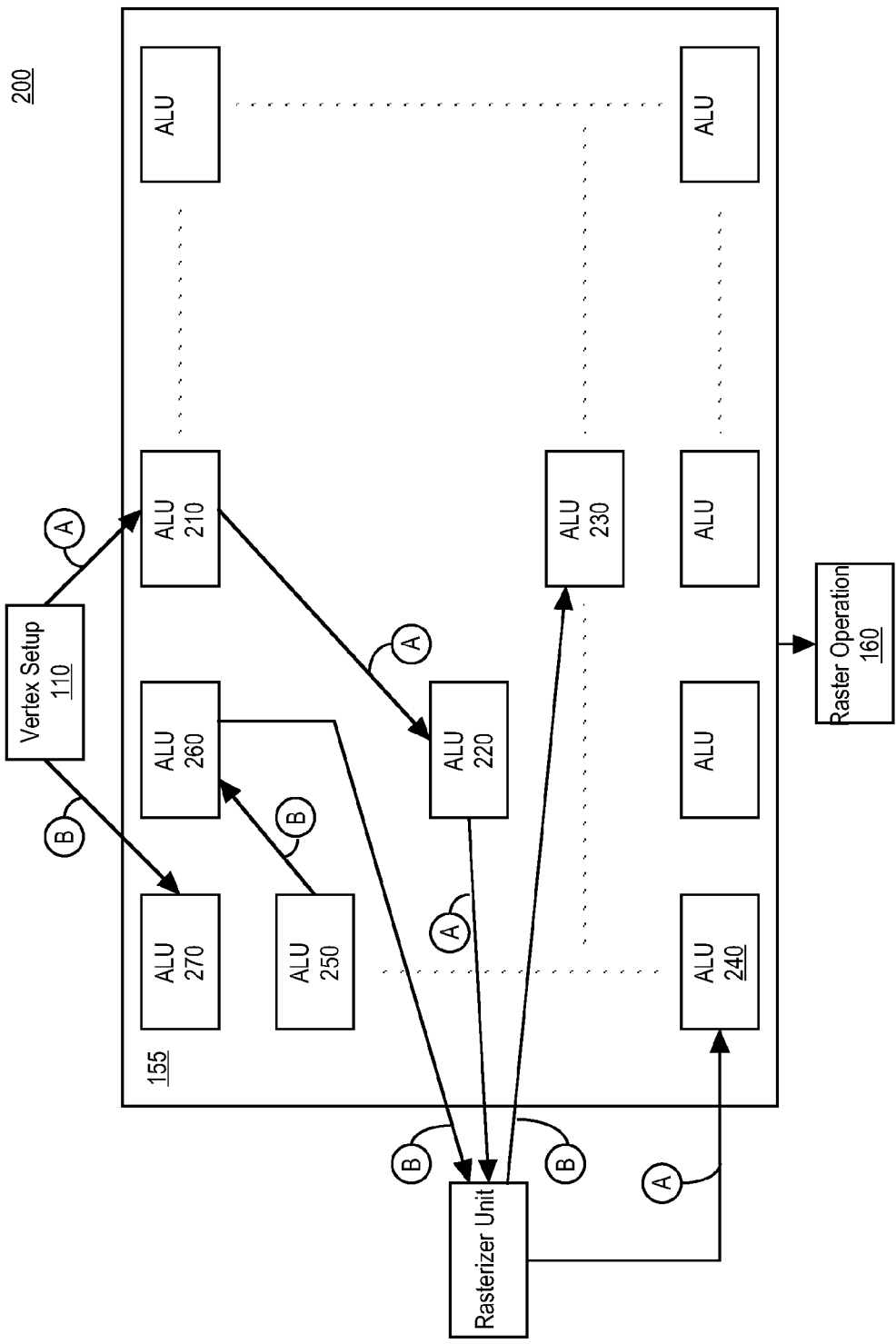
FIG. 2 shows an exemplary GPU with a unified shader processing subunit in accordance with one embodiment of the present invention.

Referring now to FIG. 2, an exemplary system 200 comprising the unified shader processing subunit 155 in accordance with one embodiment of the present invention is shown. As described above, the unified shader processing subunit 155 receives data from the setup vertex 110 and sends the results to the raster operation 160.

In one embodiment, the unified shader unit 155 may comprise a plurality of arithmetic logic units (ALUs). In one embodiment, each ALU may be operable to handle multiple functions. For example, ALU 250 may process vertex data, geometry data, and perform pixel shading operation. The unified shader processing subunit 155 functions as described in FIG. 1. In this embodiment, substantially all of the ALUs in the unified shader processing subunit 155 are multifunctional. However, it is appreciated that in other embodiments, a portion of the ALUs may be multifunctional.

When the vertex setup 110 processes data A, the result is sent to the unified shader processing subunit 155. In one embodiment, data A is sent to any one of the ALUs that is not being utilized. In this embodiment, data A is sent from the vertex setup 110 to ALU 210, where vertex shading processing may be performed. During the time which ALU 210 is processing vertex data, the vertex setup 110 may process another set of data (e.g., data B). Accordingly, the vertex setup 110 sends the result of the next set of data B to the next available ALU in the unified shader processing subunit 155. In this embodiment, ALU 250 is the recipient of data B, where vertex processing may be performed.

In one embodiment, when the ALU 250 is processing vertex programs for data B, ALU 210 finishes processing vertex programs for data A. Accordingly, while ALU 250 is processing vertex programs for data B, ALU 210 may send the result of its processing of vertex programs for data A to the next available ALU, in this instance ALU 220, where geometry processing is performed. During the time which ALU 220 is processing geometry data, ALU 250 may finish processing the vertex program for data B and send the result to the next available ALU, in this instance 260 for processing geometry data.

Similarly when ALU 260 is processing the geometry for data B, ALU 220 may finish processing geometry information for data A. Accordingly, processed geometry information for data A is sent to the rasterizer subunit 140 where rasterizer processing for data A is performed. Accordingly, while ALU 260 is processing geometry information for data B, rasterizer subunit 140 may process rasterizer data A.

During the time which the rasterizer subunit 140 is rasterizing data A, ALU 260 may finish processing geometry information for data B. Accordingly, the processed geometry information for data B is sent to the rasterizer subunit 140 where rasterization of data B is performed. When the rasterizer subunit 140 finishes rasterization of data A, the rasterizer subunit 140 sends the result to the next available ALU, in this instance ALU 240 for processing the pixels for data A. Accordingly, while ALU 240 is processing the pixels for data A, the rasterizer subunit 140 is rasterizing data B. Upon finishing rasterizing data B, the rasterizer subunit 140 sends the result to the next available ALU, in this instance ALU 230 where pixel shading is performed.

When ALU 230 is processing pixel shading for data B, ALU 240 may finish processing pixel shading for data A and output the result to the raster operation subunit 160. Similarly, when ALU 230 finishes processing pixel shading for data B the result is sent to the raster operation 160.

It is appreciated that even though processing of two sets of data, A and B, is described above, additional data may be processed. For example, after data B is sent to ALU 250 from the vertex setup 110, data C (not shown) may be sent to the next available ALU (e.g., ALU 270). Accordingly, the processing of data C may continue in parallel to data A and B. It is appreciated that the processing of various data with different ALUs causes parallel processing of various data at different stages. For example, when one set of data is processed for vertex programs, another set of data is processed for pixel shading and etc. Hence, calculating and providing performance parameters (e.g., utilization and bottleneck) for the unified shader processing subunit 155 as a whole does not provide visibility as to the type of data being processed and its performance parameters. Accordingly, it is helpful to provide performance parameters for each type of data being processed (e.g., pixel shading, vertex processing, and etc.). Providing performance parameters for each type of data being processed enables software developers to visualize component workloads of a unified processing subunit. As a result, the efficiency of a processing pipeline and unified processing subunits may be improved by improving the application program.

In one embodiment, performance parameters refer to utilization and bottlenecks for each processing subunit. The method to calculate utilization and bottlenecks are described in the U.S. patent application Ser. No. 11/497,863 filed on Aug. 1, 2006, by Aguaviva et al., and entitled "A Method And System For Calculating Performance Parameters For A Processor" and assigned to the assignee of the present invention and is incorporated herein by reference. Aguaviva calculates and provides performance parameters for a processor without revealing proprietary information of the manufacturer of the processor. In Aguaviva, bottleneck and utilization of a processing subunit within a processor pipeline is calculated. Accordingly, the calculated parameters may be used to identify and address the slower stages of the pipeline in order to improve the performance of the processor. According to Aguaviva, utilization is a measure of a percentage that a processor subunit is utilized over the duration of a draw call. In one embodiment, the utilization parameter of a processor subunit may be defined by the following equation:

$$\text{Utilization} = \frac{t_1}{t}$$

where t is the elapsed time for the GPU to complete the draw call and $t_1$ is the time required by the processing subunit to process the draw call. The method which utilization may be determined can be extended to determining utilization of a unified processing subunit processing a particular type of data. Accordingly, utilization for a unified processing subunit processing a type of data is as follows:

$$\text{Utilization of data type for a unified subunit} = \frac{t_2}{t}$$

where $t_2$ is the time required by the processing subunit to process a particular type of data in a draw call (e.g., pixel shading, vertex processing, and etc.).

Similarly, the bottleneck parameter may be calculated as shown by Aguaviva to be:

$$\text{Bottleneck} = \frac{t_3 + \tau_2 - \tau_3}{t}$$

where $t_3$ is the period that the subunit or ALU is actively accepting data, $\tau_2$ is the period of time that the processor subunit is full or busy and cannot accept additional data from an upstream unit (e.g., ALU unit or the vertex setup 110), and $\tau_3$ is the period of time that the processor subunit is paused and stopped from sending its processed data to its downstream processor subunit because the downstream subunit is busy (e.g., the raster operation 160 or another ALU unit), and t is the elapsed time for the GPU to complete the draw call.

To determine the bottleneck and the utilization for any given data type in a unified processing unit (e.g., the unified shader processing subunit 155), ALU units may be queried to determine the type of data being processed by the ALU at the time of querying the ALU. In one embodiment, a given ALU (e.g., ALU 270) may be queried over a draw call. Since each ALU is multifunctional, querying a given ALU may provide statistically accurate information for a plurality of data types processed by the unified shader processing subunit 155 as a whole. However, it is appreciated that more than one ALU may be queried to determine the type of data being processed and its performance parameters. Additionally, it is appreciated that the rate of sampling the ALU may vary.

It is appreciated that in one embodiment of the present invention, each subunit may comprise a counter. Accordingly, a program is processed at least once by the processing pipeline in order to obtain the performance parameters of each subunit, including the unified shader processing subunit. In one embodiment, the performance parameters are calculated and determined from information stored in the counter of each processing subunit. In order to determine the performance parameters for each type of data being processed by the unified shader processing subunit, the program is processed by the unified shader processing subunit at least once for each type of data. In other words, to determine the performance parameters for the type of data being processed by the unified shader processing subunit (e.g., pixel shading and vertex processing), the unified shader processing subunit executes the program at least once for each type of data being processed (e.g., pixel shading and vertex processing).

It is further appreciated that the performance parameters may be calculated and determined by executing a program by the pipeline once. In order to obtain the performance parameters by processing a program once, the unified shader processing subunit may comprise a plurality of counters equal to the number of different data types that it processes. Accordingly, each counter is operable to store information for a particular data type. Accordingly, the stored information in each counter may be used to determine the performance parameters for that particular data type being processed by the unified shader processing subunit. For example, if the unified shader processing subunit processes vertex data, geometry data and pixel shading data, then at least three counters are used in the unified shader processing subunit, one counter for each type of data being processed by the unified shader processing subunit (e.g., vertex, geometry, and pixel shading data).

Figure 3:
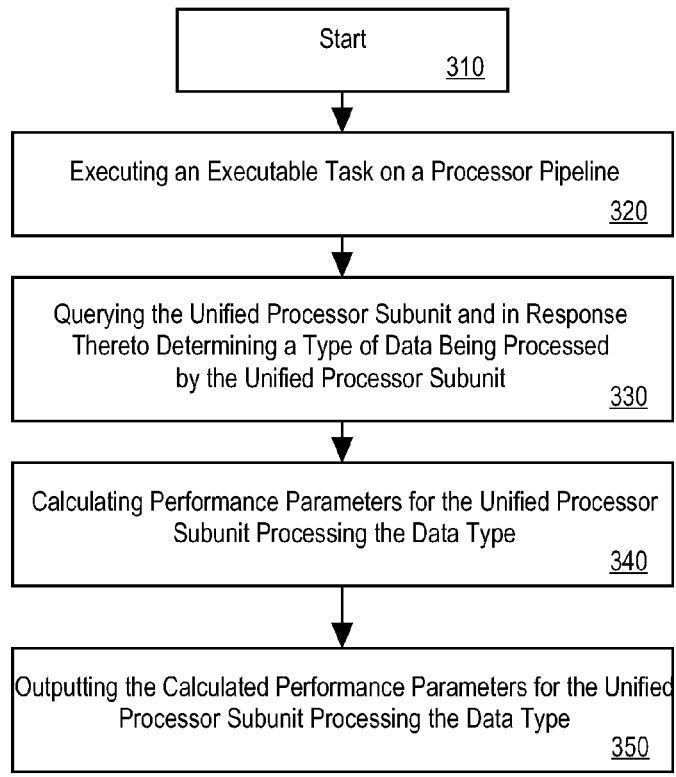
FIG. 3 shows a flow diagram of an exemplary computer implemented process for calculating the performance parameters for a type of data executed by a unified processing subunit in accordance with one embodiment of the present invention.

Referring now to FIG. 3, a flow diagram 300 of an exemplary computer implemented process for calculating the performance parameters for a type of data being executed by a unified processing subunit in accordance with one embodiment of the present invention is shown. It is appreciated that the steps shown are exemplary and not intended to limit the scope of the present invention.

At step 310, the method for calculating the performance parameters for a unified processing subunit starts. In one embodiment, the performance parameters may comprise utilization and bottleneck information for an identified type of data being executed, as described above. Moreover, a unified processing subunit may be a unified shader processing subunit 155 as described in FIGS. 1 and 2.

At step 320, an executable task (e.g., a draw call) is executed by a processing pipeline unit (e.g., GPU). A draw call may require a variety of data processing operations (e.g., vertex processing, pixel shading, geometry processing and etc.). Accordingly, each processing subunit may perform one type of data processing. However, a unified processing subunit is multifunctional as described above. Accordingly, a unified processing subunit may perform various types of data processing. For example, a unified processing subunit may be the unified shader processing subunit 155 that may perform vertex processing, geometry processing and pixel shading, to name a few. As described above, a unified shader processing subunit may comprise a plurality of ALUs that may process various data. Accordingly, in order to determine the type of data processing being performed by a given ALU at a given moment, the ALU should be queried.

At step 330, a given ALU is queried to determine the type of data being processed by the ALU. For example, the result of the ALU query may be that the ALU is processing vertices pixels, geometry or pixel shading, to name a few. In one embodiment of the present invention, the first ALU is queried at regular intervals. It is appreciated that the rate of sampling (e.g., querying) may vary depending on the application. It is further appreciated that more than one ALU may be queried to statistically provide a more accurate result. However, since in this embodiment all ALUs are multi-functional, querying one ALU is sufficient to statistically provide an accurate result.

In one embodiment, the result of the query may be stored in a counter. Accordingly, the counter may be incremented each time the ALU is processing a particular data type (e.g., pixel shading). As such, the counter may be used to determine the amount of time a given ALU was processing a particular data type. In one embodiment, more than one counter may be used such that each data type has a corresponding counter. In other embodiments, one counter may be used and the process is repeated a number of times, once for each data type.

At step 340, performance parameters for the type of data being processed by a given ALU are calculated. In one embodiment, performance parameters are utilization and bottleneck information for a given ALU. Calculating bottleneck and utilization has been described above. Accordingly, performance parameters for a given ALU processing a given data type are determined. After outputting the calculated performance parameters at step 350, the process ends at step 360.

It is appreciated that in one embodiment, the output is to a memory component storing the result for later retrieval. In one embodiment, the output is an audio output. Alternatively, the output may be displayed on a screen, printed on paper or electronically mailed (emailed) to a user.

Figure 4A:
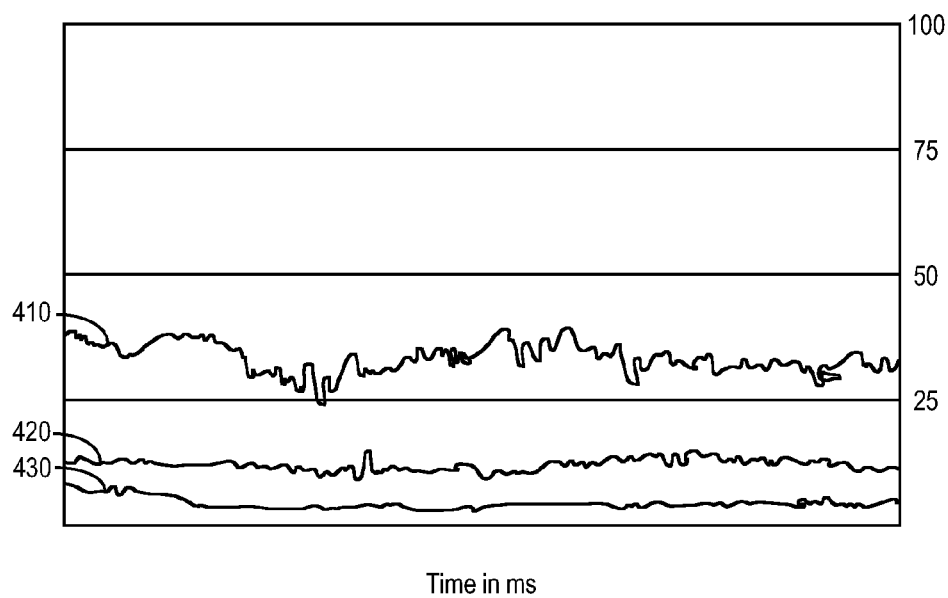
FIGS. 4A and 4B show exemplary outputs for calculated performance parameters of a GPU pipeline and a unified processing subunit in accordance with one embodiment of the present invention.
Figure 4B:
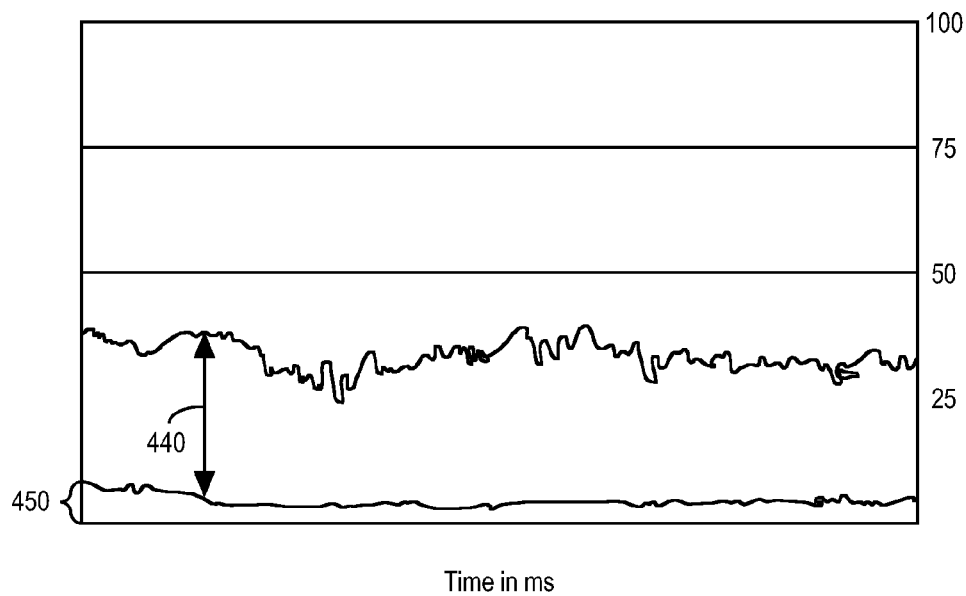

It is appreciated that in one embodiment of the present invention the output may be displayed as a graphical representation. Referring now to FIGS. 4A and 4B exemplary outputs for calculated performance parameters of a GPU pipeline and a unified shader processing subunit in accordance with one embodiment of the present invention are shown.

FIG. 4A shows a calculated utilization for a draw call executed by GPU subunits. The horizontal axis represents the time that a sample is calculated. The vertical axis represents the percentage of the time that processing subunits are utilized for that sample. Graph 410 represents the utilization of the unified shader processing subunit 155. In this example, the unified shader processing subunit is utilized more than 25% of the time over a given draw call. As described above, the unified shader processing subunit processes data types such as vertex processing, geometry processing and pixel shading, to name a few.

In contrast, graph 420 represents the utilization of the raster operation subunit 160. In this example, the raster operation processing subunit 160 is utilized approximately 12% of the time during the execution of a draw call by the GPU. Similarly, graph 430 represents the utilization of the vertex setup processing subunit 110. In this example, the vertex setup processing subunit 110 is utilized approximately 7% of the time during the execution of a draw call by the GPU.

As described above, the performance parameter (e.g., utilization) for the unified shader processing subunit does not show the breakdown of the type of data being processed by the unified shader processing subunit. Accordingly, the method 300 described above may be used to breakdown the type of processing by the unified shader processing subunit to visualize component workloads of the unified shader processing subunit 155.

Referring now to FIG. 4B, an exemplary breakdown of the component workloads (e.g., type of data being processed by the unified shader processing subunit) is shown. The stacked graph 440 represents the approximation of utilization by the unified shader processing subunit 155 processing pixel shading data. In this example, the unified shader processing subunit 155 utilizes approximately 20% to process pixel shading data. In contrast, the stacked graph 450 represents the approximation of utilization by the unified shader processing subunit 155 processing vertex data. In this example, the unified shader processing subunit 155 utilizes approximately 5% to process vertex shading data. In this exemplary embodiment, the unified shading processing subunit 155 does not perform any geometry shading processing. Accordingly, adding the calculated utilization for vertex shading represented by graph 440 and the pixel shading as represented by graph 450 correspond to the total utilization of the unified shader processing subunit 155 represented by graph 410.

It is appreciated that even though the output result is shown as a stacked graph, other embodiments may use other display methods to output and display the calculated results (e.g., pie char, 3 dimensional graph, and etc.). Accordingly, display of the calculated performance parameters in stacked graph form is exemplary and should not be construed to limit the scope of the present invention. It is further appreciated, that other performance parameters (e.g., bottleneck) may similarly be calculated and displayed.

As a result, performance parameters for the type of data (e.g., vertex, pixel, raster or geometry) being processed by the unified shader may be determined and displayed. As such, software developers can visualize component workloads (e.g., data types) of a unified processing subunit architecture. Therefore, the performance parameters may be used to determine the type of computationally intensive data causing bottlenecks or the type of data that fails to fully utilize the unified shader's resources. Accordingly, the performance parameters may be used to improve efficiency of the unified processing subunit as well as the processor pipeline as a whole by indicating potential modifications for the graphics application.

It is appreciated that the process described above may be extended to multiple processors/GPUs. Multiple processors/GPUs may be coupled in parallel or series or any combination thereof. Moreover, in one embodiment, a frame comprising multiple draw calls may be divided such that different portions of the frame are executed by a different processor/GPU. Use of multiple processors/GPUs may additionally result in other complications. For example, a bottleneck may be created by one GPU pipeline and affect the performance of the remaining GPU pipelines. However, the process described above may be used to calculate performance characteristics such as utilization and bottleneck.

Figure 5:
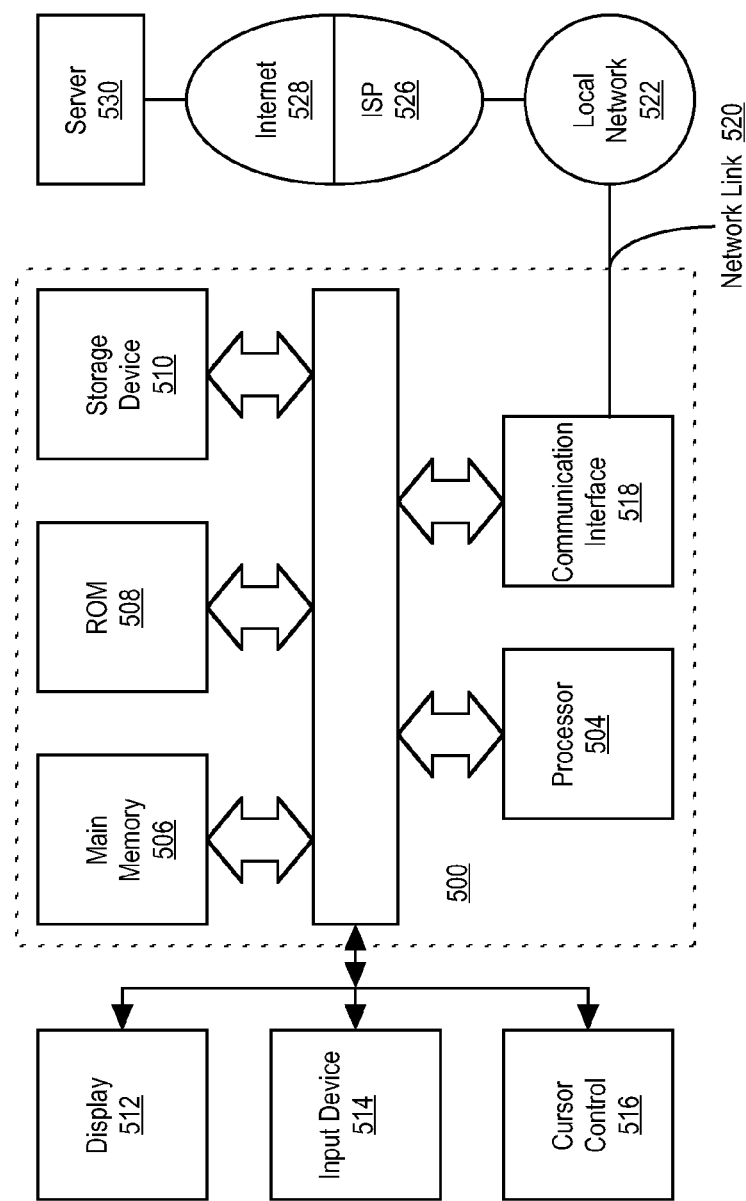
FIG. 5 illustrates a general purpose computer system that may serve as a platform for embodiments of the present invention.

FIG. 5 is a block diagram that illustrates a computer system 500 upon which an embodiment of the invention may be implemented. Computer system 500 may implement the method for calculating performance parameters for a type of data being executed by a unified processor subunit as shown in FIGS. 1-3 and includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A non-volatile storage device 510, such as a magnetic disk or optical disk, is provided and coupled to bus 502 for storing information and instructions and may store the persistent internal queue.

Computer system 500 may be coupled via bus 502 to an optional display 512, such as a cathode ray tube (CRT), for displaying information to a computer user. An optional input device 514, including alphanumeric and other keys, may be coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Computer system 500 can send and receive messages through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of calculating performance parameters for a type of data being executed by a unified processor subunit, said method comprising:
    executing an executable task on a processor pipeline comprising a plurality of processing subunits and further comprising said unified processor subunit;
    querying said unified processor subunit and in response thereto determining a data type being processed by said unified processor subunit; and
    calculating performance parameters for said unified processor subunit processing said data type, wherein said calculating performance parameters comprises calculating a bottleneck that is a measurement of adverse performance of said plurality of processing subunits caused by said unified processor subunit, and wherein said bottleneck is a function of performance parameters associated with said unified processor subunit and parameters associated with said processing pipeline, and wherein said bottleneck is a measure of time that said unified processor subunit is processing said data type plus a measure of time that said unified processor subunit pauses an upstream component because said unified processor subunit is busy minus the time which said unified processor subunit is paused because a downstream component is busy and does not accept further data, all over the time required by said processing pipeline to process said executable task, and wherein said calculating is based on a counter operable to increment based on an individual processing of said data type.

2. The method as described in claim 1, wherein said unified processor subunit is operable to process at least two types of data.

3. The method as described in claim 1, wherein said calculating said performance parameters for said unified processor subunit processing said data type comprises:
    calculating utilization, wherein said utilization is a measure of a percentage that said unified processor subunit is processing said data type over the time said processing pipeline required to process said executable task.

4. The method as described in claim 1, wherein said plurality of processing subunits comprises a plurality of arithmetic logic units (ALUs), wherein said plurality of ALUs partially form an upstream component and a downstream component of said unified processor subunit.

5. The method as described in claim 1, wherein said processor pipeline is a pipeline graphical processing unit (GPU), and wherein said executable task is a draw call processed on said GPU, and wherein said unified processing subunit is capable of processing vertex, geometry, rasterizer and pixel data types.

6. The method as described in claim 1, wherein said method further comprises:
    outputting said calculated performance parameters for said unified processor subunit processing said data type.

7. The method as described in claim 1 further comprising:
    displaying calculated performance parameters for a plurality of data types processed by said unified processor subunit in a stacked graph format.

8. A non-transitory computer-useable storage medium having computer-readable program code stored thereon for causing a computer system to execute a method for calculating performance parameters for a type of data being executed by a unified processor subunit, said method comprising:
    executing an executable task on a processor pipeline comprising a plurality of processing subunits and further comprising said unified processor subunit;
    querying said unified processor subunit and in response thereto determining a data type being processed by said unified processor subunit; and
    calculating performance parameters for said unified processor subunit processing said data type, wherein said calculating performance parameters comprises calculating a bottleneck that is a measurement of adverse performance of said plurality of processing subunits caused by said unified processor subunit, and wherein said bottleneck is a function of performance parameters associated with said unified processor subunit and parameters associated with said processing pipeline, and wherein said bottleneck is a function of performance parameters associated with said unified processor subunit and parameters associated with said processing pipeline, and wherein said bottleneck is a measure of time that said unified processor subunit is processing said data type plus a measure of time that said unified processor subunit pauses an upstream component because said unified processor subunit is busy minus the time which said unified processor subunit is paused because a downstream component is busy and does not accept further data, all over the time required by said processing pipeline to process said executable task, and wherein said calculating is based on a counter operable to increment based on an individual processing of said data type.

9. The non-transitory computer-useable storage medium as described in claim 8, wherein said unified processor subunit is operable to process at least two types of data.

10. The non-transitory computer-useable storage medium as described in claim 8, wherein said calculating said performance parameters for said unified processor subunit processing said data type comprises:
  calculating utilization, wherein said utilization is a measure of a percentage that said unified processor subunit is processing said data type over the time said processing pipeline required to process said executable task.

11. The non-transitory computer-useable storage medium as described in claim 8, wherein said plurality of processing subunits comprises a plurality of arithmetic logic units (ALUs), wherein said plurality of ALUs partially form an upstream component and a downstream component of said unified processor subunit.

12. The non-transitory computer-useable storage medium as described in claim 8, wherein said processor pipeline is a pipeline graphical processing unit (GPU), and wherein said executable task is a draw call processed on said GPU, and wherein said unified processing subunit is capable of processing vertex, geometry, rasterizer and pixel data types.

13. The non-transitory computer-useable storage medium as described in claim 8, wherein said method further comprises:
  outputting said calculated performance parameters for said unified processor subunit processing said data type.

14. The computer-useable storage medium as described in claim 8, wherein said method further comprises:
  displaying calculated performance parameters for a plurality of data types processed by said unified processor subunit in a stacked graph format.

15. A computer system comprising a processor coupled to a bus, a transmitter/receiver coupled to said bus, and a memory coupled to said bus, wherein said memory comprises instructions that when executed on said processor implement a method for calculating performance parameters for a type of data being executed by a unified processor subunit, said method comprising:
  executing an executable task on a processor pipeline comprising a plurality of processing subunits and further comprising said unified processor subunit;
  querying said unified processor subunit and in response thereto determining a data type being processed by said unified processor subunit; and
  calculating performance parameters for said unified processor subunit processing said data type, wherein said calculating performance parameters comprises calculating a bottleneck that is a measurement of adverse performance of said plurality of processing subunits caused by said unified processor subunit, and wherein said bottleneck is a function of performance parameters associated with said unified processor subunit and parameters associated with said processing pipeline, and wherein said bottleneck is a function of performance parameters associated with said unified processor subunit and parameters associated with said processing pipeline, and wherein said bottleneck is a measure of time that said unified processor subunit is processing said data type plus a measure of time that said unified processor subunit pauses an upstream component because said unified processor subunit is busy minus the time which said unified processor subunit is paused because a downstream component is busy and does not accept further data, all over the time required by said processing pipeline to process said executable task, and wherein said calculating is based on a counter operable to increment based on an individual processing of said data type.

16. The computer system as described in claim 15, wherein said unified processor subunit is operable to process at least two types of data.

17. The computer system as described in claim 15, wherein said calculating said performance parameters for said unified processor subunit processing said data type comprises:
  calculating utilization, wherein said utilization is a measure of a percentage that said unified processor subunit is processing said data type over the time said processing pipeline required to process said executable task.

18. The computer system as described in claim 15, wherein said plurality of processing subunits comprises a plurality of arithmetic logic units (ALUs), wherein said plurality of ALUs partially form an upstream component and a downstream component of said unified processor subunit.

19. The computer system as described in claim 15, wherein said processor pipeline is a pipeline graphical processing unit (GPU), and wherein said executable task is a draw call processed on said GPU, and wherein said unified processing subunit is capable of processing vertex, geometry, rasterizer and pixel data types.

20. The computer system as described in claim 15, wherein said method further comprises:
  outputting said calculated performance parameters for said unified processor subunit processing said data type.

21. The computer system as described in claim 15, wherein said method further comprises:
  displaying calculated performance parameters for a plurality of data types processed by said unified processor subunit in a stacked graph format.

22. The method as described in claim 1, wherein said calculating of said performance parameters is based on said data type being processed by said unified processor subunit in performing a function of said unified processor subunit.

* * * * *